United States Patent [19]
Sasagaki et al.

[11] Patent Number: 5,991,550
[45] Date of Patent: Nov. 23, 1999

[54] CAMERA

[75] Inventors: Nobuaki Sasagaki, Yokohama; Masatoshi Kanzaki, Kawasaki, both of Japan

[73] Assignee: Nikon Corporation, Tokyo, Japan

[21] Appl. No.: 08/887,252

[22] Filed: Jul. 2, 1997

[30] Foreign Application Priority Data

Jul. 25, 1996 [JP] Japan .................................. 8-196099
Jul. 25, 1996 [JP] Japan .................................. 8-196110

[51] Int. Cl.$^6$ .................................................. G03B 17/24
[52] U.S. Cl. .......................................... 396/319; 396/409
[58] Field of Search .................................... 396/310, 311, 396/319, 320, 207, 208, 284, 409, 410, 392

[56] References Cited

U.S. PATENT DOCUMENTS

| | | | |
|---|---|---|---|
| 5,453,805 | 9/1995 | Itoh | 396/319 |
| 5,467,156 | 11/1995 | Ezawa et al. | 396/208 |
| 5,596,381 | 1/1997 | Murakami et al. | 396/207 |
| 5,617,161 | 4/1997 | Serita et al | 396/319 |
| 5,701,539 | 12/1997 | Amano | 396/410 |

FOREIGN PATENT DOCUMENTS 7-199329  8/1995  Japan .

*Primary Examiner*—Safet Metjahic
*Assistant Examiner*—Michael Dalakis

[57] ABSTRACT

A camera has a control device (MCU) for controlling magnetic recording of photographing data in units of photographing frames stored upon photographing onto the corresponding photographing frames on the film upon film rewinding. The camera has a photographable frame number detection device for detecting the number of photographable frames of the film from an information device provided to a film cartridge, and a film counter device for incrementing the count number every time one frame is photographed. Also, the camera has a film end detection device for detecting the film end, and a comparison device for comparing the number of photographable frames detected by the photographable frame number detection device with the count number of the film counter device when the film end detection device detects the film end. Furthermore, the camera has an alarm display device (DSP) for producing an alarm indicating errors in magnetic recording when the comparison device detects a non-coincidence between the two values. With this arrangement, a problem posed upon magnetically recording the photographing data during film rewinding when the film counter has caused errors during film forwarding can be solved, and an alarm display can be performed for the photographer.

11 Claims, 11 Drawing Sheets

CAMERA

The entire disclosure of Japanese Patent Application Nos. 8-196099 and 8-196110 including specifications, claims, drawings and summaries is incorporated herein by reference in their entirety.

BACKGROUND OF THE INVENTION

1. Field of the Invention

The present invention relates to a camera which can magnetically record information such as photographing data on a magnetic recording region formed on a film.

2. Related Background Art

In recent years, a film which has a magnetic recording region, and can magnetically record information such as various photographing data in units of photographing frames, and a camera using such film have been proposed. The photographing data to be recorded on such magnetic recording region include, e.g., various kinds of photographing data information such as the exposure condition upon taking a picture, the photographing magnification, the presence/absence of flash light, the photographing date, and the like.

Also, a film cartridge that stores such film has an information device of photographing data. For example, Japanese Patent Application Laid-Open No. 7-199329 proposes a film cartridge on a portion of which a bar-code data indicator is pivotally arranged. In such film cartridge, a "fully exposed film", "unexposed film", "partially exposed film", and the like can be identified depending on the initial stop position of the bar-code data indicator as the information device. Also, the number of photographable frames of a film can be read from a code pattern on the bar-code data indicator.

In a camera using a film having such magnetic recording region, magnetic recording is done during film forwarding or rewinding. When magnetic recording is done during film forwarding, it is difficult to increase the film feed speed too much to attain stable write. Hence, in a camera which is required to have a continuous photographing function that requires a particularly high frame feed speed, magnetic recording is preferably inhibited during film forwarding. In this case, photographing data are temporarily stored in another storage device, and are simultaneously written in the individual frames upon film rewinding.

In the above-mentioned camera, when photographing data are written upon film rewinding, the photographing data stored in units of frames must be written in the corresponding frames during film rewinding.

However, if rewinding errors have occurred due to, e.g., the use-up state of the battery during film rewinding, the film counter number is often different from the actual frame number. In such case, if magnetic recording is performed during film rewinding irrespective of errors, the photographed pictures have photographing data different from their own data, and unwanted prints may be obtained. When the photographed pictures have photographing data different from their own data, if the bar-code data indicator as the information device of the cartridge is set to indicate the "unexposed" or "partially exposed" state, the film may be loaded into the camera again, and exposed frames may be double-exposed.

SUMMARY OF THE INVENTION

The present invention has been made in consideration of the above-mentioned problems, and its first aspect has as its object to provide a camera, which can produce an alarm for a photographer or can perform an alarm display that can be recognized by the photographer to call his or her attention upon printing, for example, when a film counter causes count errors during film forwarding, and magnetic recording upon film rewinding cannot be normally done.

It is another object of the present invention to provide a camera which inhibits magnetic recording when the above-mentioned problem has occurred, so as to avoid prints that the photographer does not want.

Furthermore, it is still another object of the present invention to provide a camera which forcibly sets an information device of a film cartridge in the "fully exposed" state when the above-mentioned problem has occurred, so as to prevent double-exposure of exposed frames.

In order to achieve the above objects, according to the present invention, a camera which stores photographing data in units of photographing frames upon photographing, and magnetically records the stored photographing data in magnetic recording regions of the corresponding photographing frames on a film during film rewinding, comprises a control device for magnetically recording the stored photographing data on the magnetic recording regions of the corresponding photographing frames on the film during film rewinding, a photographable frame number detection device for detecting the number of photographable frames of the film from an information device provided to a film cartridge, a film counter device for incrementing a count number every time one frame is photographed, a film end detection device for detecting a film end, and a comparison device for comparing the number of photographable frames detected by the photographable frame number detection device with the count number of the film counter device when the film end detection device detects the film end.

The camera according to the present invention comprises an alarm display device for producing an alarm indicating errors in magnetic recording, and when the comparison device for comparing the number of photographable frames detected by the photographable frame number detection device with the count number of the film counter device detects a non-coincidence between the two values, the alarm display device performs an alarm display.

Also, in the camera according to the present invention, when the comparison device for comparing the number of photographable frames detected by the photographable frame number detection device with the count number of the film counter device detects a coincidence between the two values, the control device for magnetically recording the photographing data performs normal magnetic recording, and when the comparison device detects a non-coincidence between the two values, magnetic recording by the control device is inhibited.

Furthermore, the camera according to the present invention comprises a set device for setting the film cartridge in different states corresponding to an exposed state after completion of film rewinding, and when the comparison device for comparing the number of photographable frames detected by the photographable frame number detection device with the count number of the film counter device detects a non-coincidence between the two values, the set device sets the film cartridge in a fully exposed state after completion of film rewinding irrespective of an actual exposed state of the film.

Moreover, the camera according to the present invention comprises a partially exposed film rewinding start device for rewinding the film from an arbitrary number of frames, and a continuous forwarding control device for continuously forwarding the film until the film end detection device detects the film end when the partially exposed film rewinding start device is started.

The camera according to the present invention comprises a set device for setting the film cartridge in different states in correspondence with an exposed state after completion of film rewinding, and when the comparison device for comparing the number of photographable frames detected by the photographable frame number detection device with the count number of the film counter device detects a non-coincidence between the two values, the set device sets the film cartridge in a fully exposed state after completion of film rewinding irrespective of an actual exposed state of the film.

According to the present invention, since the number of photographed frames and film counter are checked at the film end, if errors are detected, an alarm display is made to inform the photographer of the errors. For example, when the photographer asks a processing laboratory to develop and print this film, he or she can inform the processing laboratory of the errors to prevent unwanted prints from being formed. Also, according to the present invention, when the above-mentioned errors are detected, magnetic recording is inhibited, and unwanted prints based on magnetically recorded data can be prevented from being formed.

Furthermore, according to the present invention, when the comparison device detects errors, the set device sets the exposed state of the film cartridge in the "fully exposed" state upon completion of film rewinding irrespective of the actual exposed state of the film, thereby preventing double-exposure of this film by reloading it.

According to the present invention, when the film end is detected and the film is automatically rewound, or when the partially exposed film is rewound, the above-mentioned alarm display of the errors is made, magnetic recording is inhibited, and the film cartridge is set in the "fully exposed" state.

The present invention has been made in consideration of the above-mentioned problem, and its second aspect has as its object to provide a camera which detects errors of a film counter during film forwarding, and produces an alarm message indicating the errors for a photographer, or makes an alarm display that can be recognized by the photographer, thereby calling the photographer's attention upon printing.

It is another object of the present invention to provide a camera which forcibly sets in "full exposed" state an information device of a film cartridge when the above-mentioned problem has occurred, and can avoid double-exposure of exposed frames.

In order to achieve the above objects, according to the present invention, a camera which stores photographing data in units of photographing frames upon photographing, and magnetically records the stored photographing data in magnetic recording regions of the corresponding photographing frames on a film during film rewinding, comprises a film counter device for incrementing a counter number every time one frame is photographed during film forwarding, and decrementing the count number during film rewinding every time the film is rewound by one frame, a rewinding completion detection device for detecting completion of film rewinding, and a detection device for detecting if the count number of the film counter device is a predetermined number when the rewinding completion detection device detects completion of film rewinding.

The camera according to the present invention comprises an alarm display device for producing an alarm indicating errors in magnetic recording, and when the detection device for detecting if the count number of the film counter device is the predetermined number detects that the count number of the film counter device is not the predetermined number, the alarm display device performs an alarm display.

Also, the camera according to the present invention comprises a set device for setting the film cartridge in different states in correspondence with an exposed state after completion of film rewinding, and when the detection device for detecting if the count number of the film counter device is the predetermined number detects that the count number of the film counter device is not the predetermined number, the set device sets the film cartridge in a fully exposed state after completion of film rewinding irrespective of an actual exposed state of the film.

According to the present invention, a camera which stores photographing data in units of photographing frames upon photographing, and magnetically records the stored photographing data in magnetic recording regions of the corresponding photographing frames on a film during film rewinding, comprises a film counter device for incrementing the count number every time one frame is photographed during film forwarding, and decrementing the count number during film rewinding every time the film is rewound by one frame, and an abnormal signal output device for outputting an abnormal signal when the count number of the film counter device becomes lower than the predetermined number during film rewinding.

Furthermore, the camera according to the present invention comprises an alarm display device for producing an alarm indicating errors in magnetic recording, and when the abnormal signal output from the abnormal signal output device is detected since the count number of the film counter device has exceeded the predetermined number during film rewinding, the alarm display device performs an alarm display.

Moreover, the camera according to the present invention comprises a set device for setting the film cartridge in different states in correspondence with an exposed state after completion of film rewinding, and when the abnormal signal output from the abnormal signal output device is detected since the count number of the film counter device has exceeded the predetermined number during film rewinding, the set device sets the film cartridge in a fully exposed state irrespective of an actual exposed state of the film.

According to the present invention, since the film counter device is checked upon completion of film rewinding, if errors of the film counter device are detected, an alarm display can be made to inform the photographer of the errors. Hence, when the photographer asks a processing laboratory to develop and print this film, he or she can inform the processing laboratory of the errors to prevent unwanted prints from being formed.

According to the present invention, when errors are detected by checking, as described above, the set device sets the exposed state of the cartridge in the "fully exposed" state upon completion of film rewinding irrespective of the actual exposed state of the film, thereby preventing double-exposure of this film by reloading it.

Furthermore, when the film counter device exceeds a predetermined number during film rewinding, and errors of the film counter device are detected, an abnormality signal is output, and an alarm display is made based on this abnormality signal, thus informing the photographer of the errors. Accordingly, when the photographer asks a processing laboratory to develop and print this film, he or she can inform the processing laboratory of the errors to prevent unwanted prints from being formed. Upon detection of the errors, the set device sets the exposed state of the cartridge in the "fully exposed" state irrespective of the actual exposed state of the film, thereby preventing double-exposure of this film by reloading it.

The film herein may be an IX240 cartridge film of a so-called Advanced Photo System, which has a film width of 24 mm, and an optical information recording region and a magnetic recording layer, is rewound and stored into a cartridge, and is fed to travel as needed. However, the present invention is not limited to such specific film. That is, the film need only be a roll film having a magnetic recording layer.

The camera is, e.g., an IX240 type camera which can load the film having a magnetic recording layer, and has a magnetic recording device.

A magnetic head as the magnetic recording device performs one or both of a write and read with respect to the magnetic recording region of the film.

The information device of the film cartridge is, for example, a bar-code data indicator such as a bar-code disc which is pivotally arranged on a portion of the cartridge. However, the present invention is not limited to this.

The set device is a device for pivoting the bar-code data indicator when different states, e.g., "fully exposed film", "unexposed film", "partially exposed film", and the like are discriminated depending on the initial stop position of the bar-code data indicator corresponding to the actual exposed state of the film in the cartridge.

DETAILED DESCRIPTION OF THE PREFERRED EMBODIMENTS

Embodiments associated with the first aspect of the present invention will be explained below with reference to the accompanying drawings.

Figure 1:
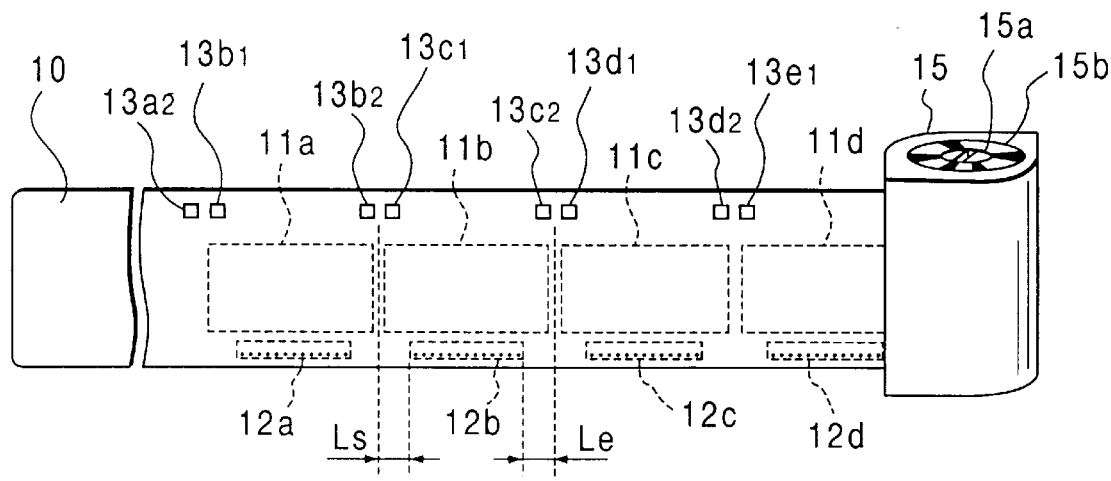
FIG. 1 is a view for explaining a film cartridge used in a camera according to the present invention, and a film stored in the cartridge.
Figure 7:
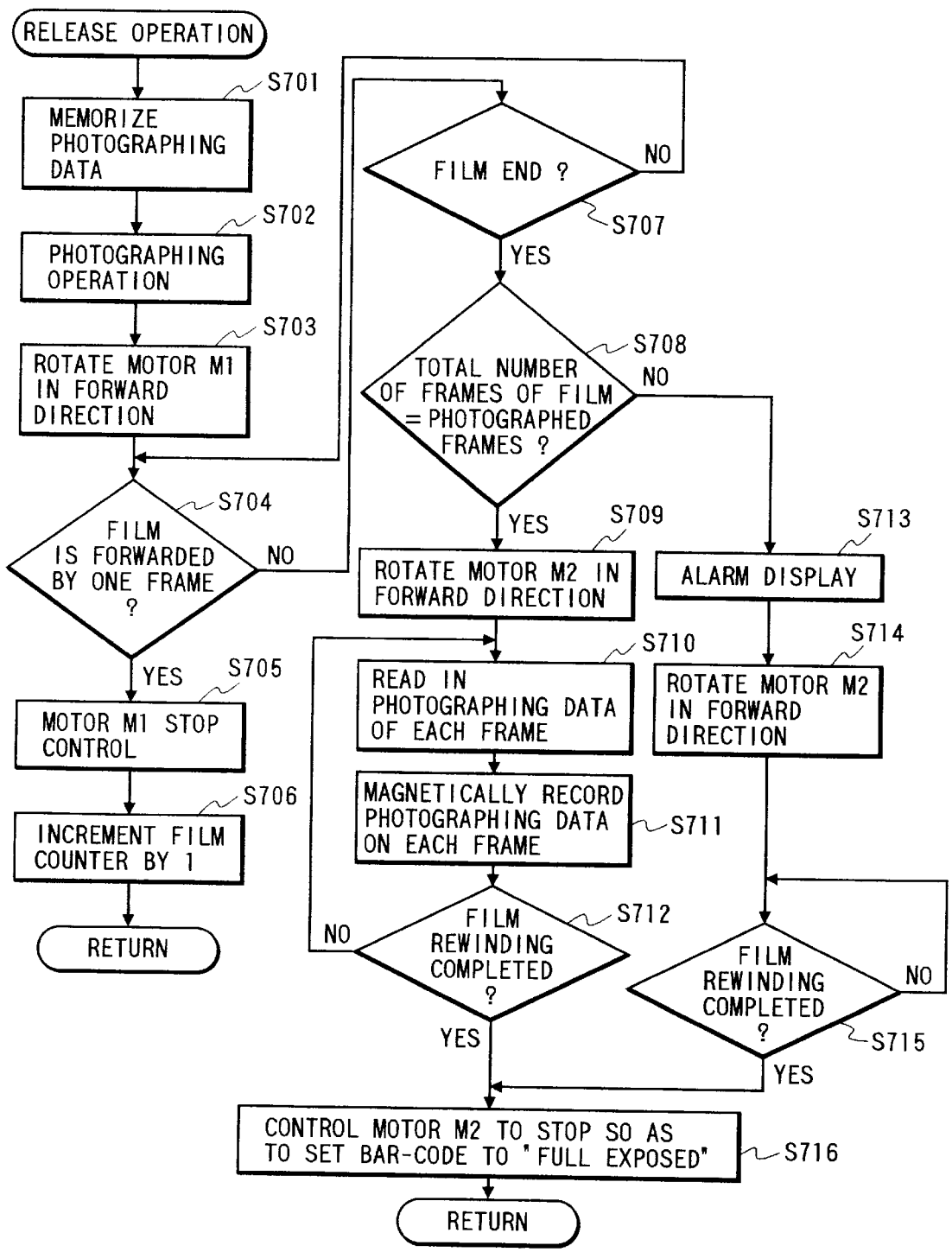
FIG. 7 is a flow chart for explaining photographing upon a release operation of the camera according to the first embodiment of the present invention.
Figure 8:
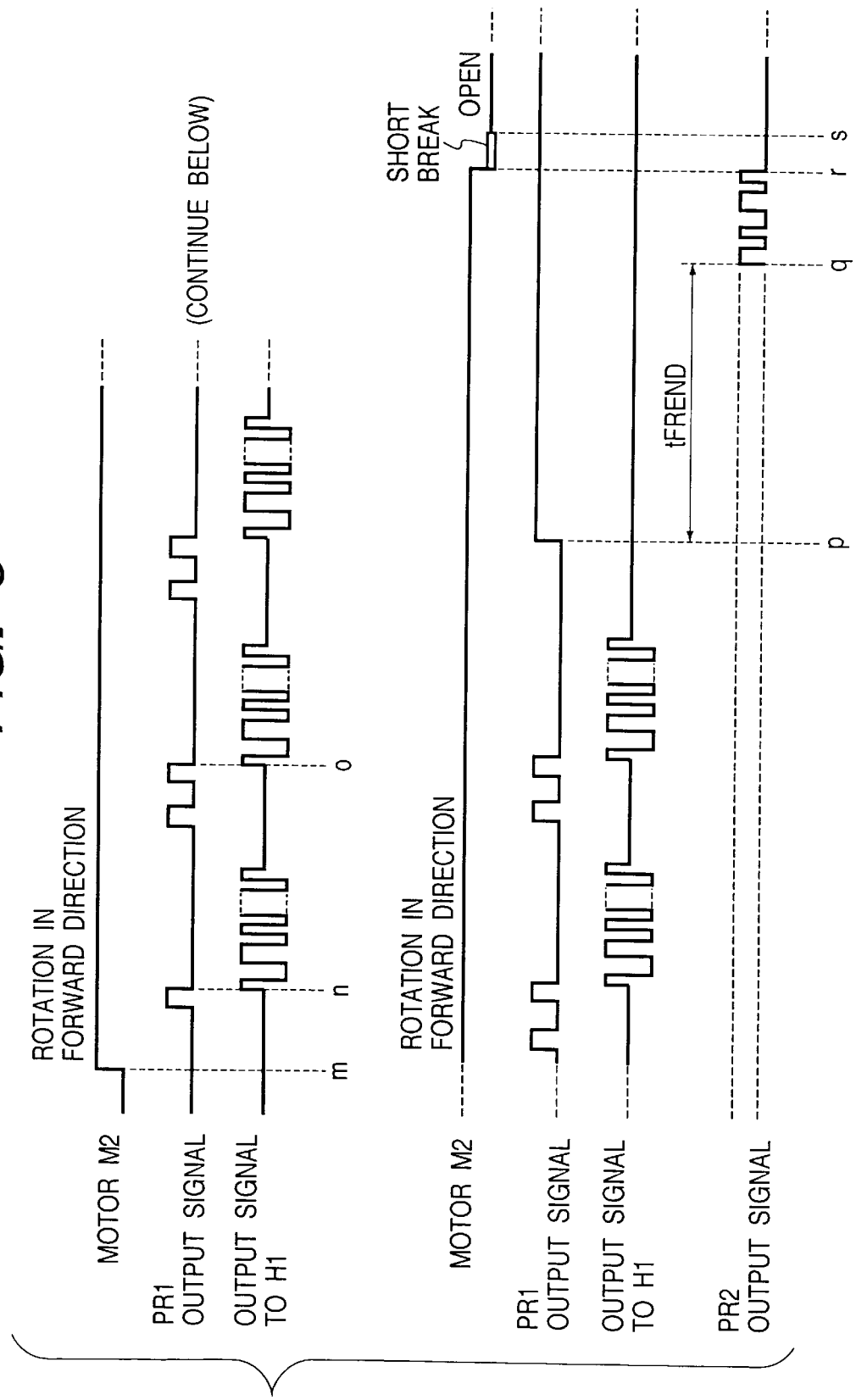
FIG. 8 is a timing chart for explaining the state wherein magnetic recording of photographing data is performed during film rewinding in the camera according to the first embodiment of the present invention.

FIGS. 7 and 8 show an embodiment of a camera according to the first aspect of the present invention. In these figures, this embodiment uses a film cartridge 15 which stores, e.g., an IX240 type film 10 having image recording regions 11 (11a, 11b, . . . ) and magnetic recording regions 12 (12a, 12b, . . . ) so as to be free to draw it out and take it up, as shown in FIG. 1. FIG. 1 illustrates the state wherein a portion of the film 10 is drawn out from the film cartridge 15.

The film 10 has two perforations 13 (13a2, 13b1, 13b2, 13c1, 13c2, . . . ) for each photographing frame serving as a photographing screen by each exposure. For example, the perforations 13c1 and 13c2 are formed in correspondence with the second photographing frame from the left side in FIG. 1 (based on the image recording region 11b).

Furthermore, this film 10 has the track-shaped magnetic recording regions 12 (12a, 12b, . . . ), and a magnetic recording allowable range for recording desired information including photographing data for each photographing frame is defined. For example, the magnetic recording region 12b is assigned to the photographing frame 11b. The two ends of the magnetic recording region 12 (12a, 12b, . . . ) corresponding to each photographing frame 11 (11a, 11b, . . . ) are defined at inner positions separated by lengths Ls and Le from the boundary positions of the individual photographing frames.

The film cartridge 15 has a rotation shaft 15a, and a bar-code disc 15b serving as a bar-code data indicator, which rotates integrally with the rotation shaft 15a. The bar-code disc 15b can identify four different states, i.e., "unexposed", "partially exposed", "fully exposed", and "developed", of the film 10 depending on its stop position. The number of photographable frames of film 10 stored into the cartridge 15 can be detected by reading the bar-code state.

Figure 2:
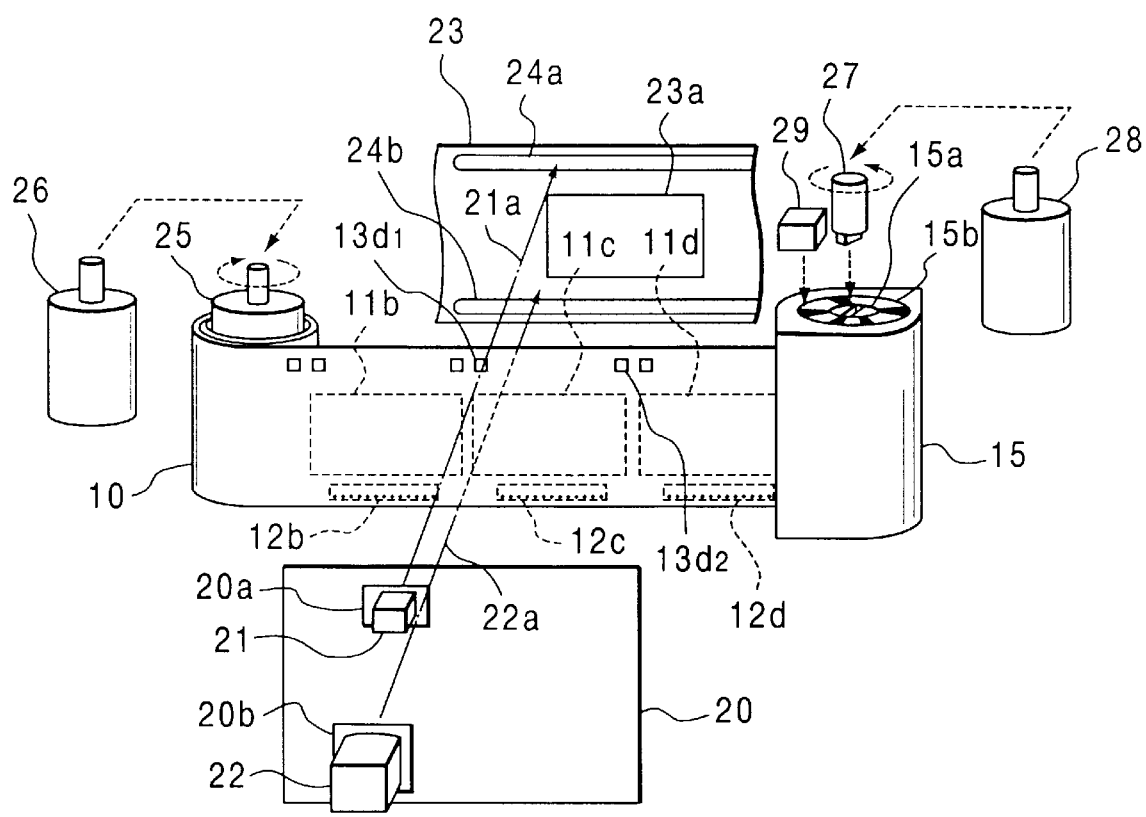
FIG. 2 is a view showing a mechanism associated with a film in the camera that uses the film cartridge shown in FIG. 1.

FIG. 2 shows portions associated with the film 10 in a camera main body (not shown) in the camera using the above-mentioned film cartridge 15, for example, a feed mechanism for forwarding/rewinding the film 10, a photoreflector 21 serving as a detection device for detecting the position of the film 10 using the perforations 13 (13a2, 13b1, 13b2, 13c1, 13c2, . . . ), and a magnetic head 22 serving as a magnetic recording device for magnetically recording information such as photographing data on the magnetic recording regions 12 (12a, 12b, . . . ). Note that a pressure plate 20 of the camera main body has openings 20a and 20b in correspondence with the photoreflector 21 and the magnetic head 22, so that the photoreflector 21 and the magnetic head 22 directly oppose the film surface.

In FIG. 2, an aperture portion 23 of the camera main body has an aperture 23a for forming an object image on the image recording region 11 (11a, 11b, . . . ) of each photographing frame by exposure, and upper and lower rails 24a and 24b for defining the position of the film 10 in the optical axis direction are arranged on the upper and lower portion of the surface of the aperture portion 23, which opposes the film 10.

The above-mentioned pressure plate 20, film 10, and aperture portion 23 are arranged to be in tight contact with each other with little gaps, and the photoreflector 21 detects the reflectance at the height position of the perforations of the film 10 and at the height position of the upper rail 24a, as indicated by a chain line 21a in FIG. 2. The photoreflector 21 outputs "H" as a digital signal when it opposes the upper rail surface 24a having a high reflectance via each perforation opening of the film 10, and it outputs "L" when it opposes the film surface, thereby detecting the position of the opening edge of each perforation.

The magnetic head 22 is arranged at a position opposing the magnetic recording regions 12b, 12c, and the like of the film 10.

Furthermore, in FIG. 2, a take-up spool 25 takes up the film 10. When the spool 25 rotates clockwise in FIG. 2, the film 10 travels in the forwarding direction. The spool 25 is coupled to an electric motor 26 via a driving force transmission system (not shown) for transmitting the rotation driving force.

On the other hand, a fork 27 fits on the shaft 15a of the cartridge 15. When the fork 27 rotates counterclockwise in FIG. 2, the film 10 is wound into the cartridge 15 and travels in the rewinding direction. Contrary to this, when the fork 27 rotates clockwise in FIG. 2, the film 10 is drawn out from the cartridge in the forwarding direction. The fork 27 is coupled to an electric motor 28 via a driving force transmission system (not shown) for transmitting the rotation driving force.

A second photoreflector 29 is arranged in the vicinity of the fork 27. The second photoreflector 29 can detect the bar-code pattern (bar-code data) on the bar-code disc 15b of the cartridge 15. When the shaft 15a is rotated by the electric motor 28 via the fork 27 and the bar-code disc 15b integrating the shaft 15a is rotated, the bar-code pattern and the initial stop position of the bar-code disc 15b can be detected.

Figure 3:
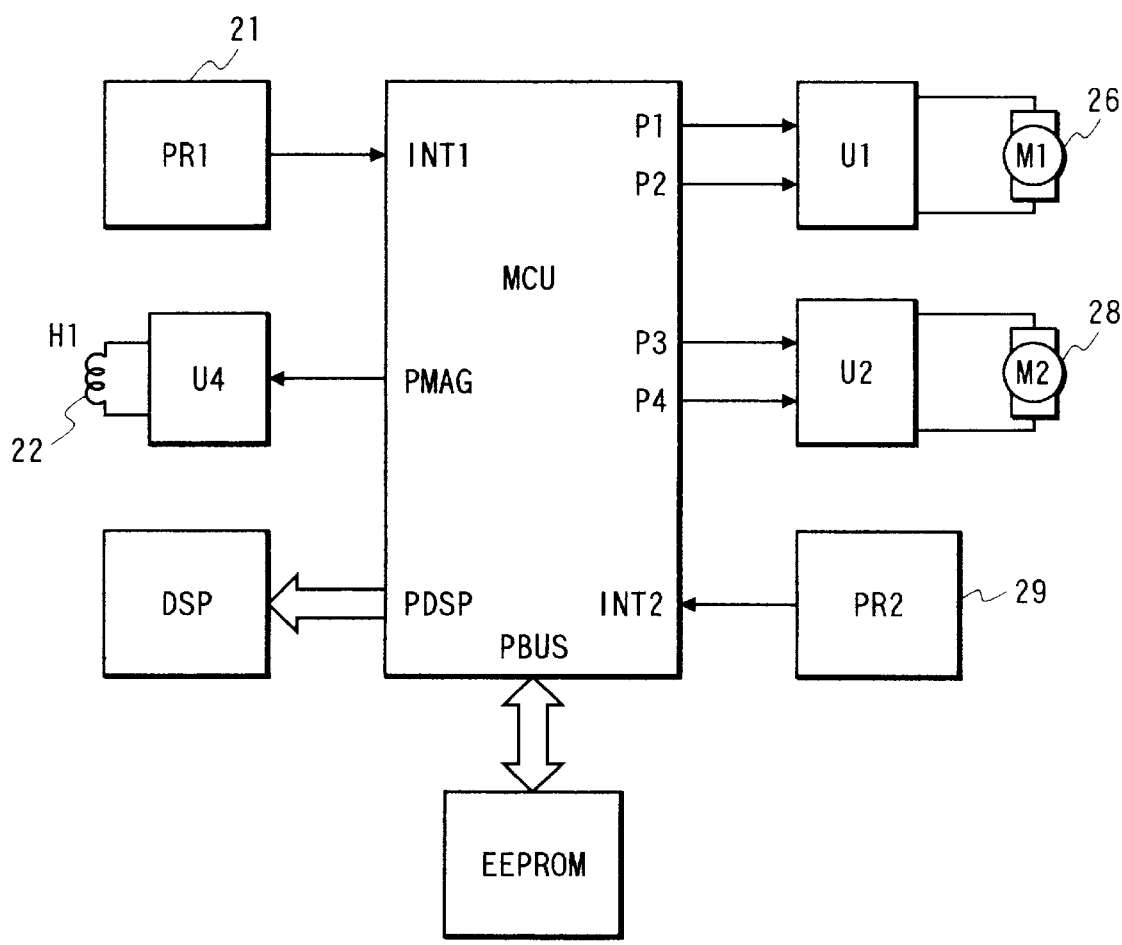
FIG. 3 is a block diagram showing principal part of the electrical circuit arrangement in the camera according to the present invention.

FIG. 3 is a block diagram showing principal part of the arrangement associated with film feeding and magnetic recording of an electrical circuit in the camera according to the present invention.

In FIG. 3, photoreflectors PR1 and PR2 supply outputs to terminals INT1 and INT2 of a microcomputer MCU.

A motor driver circuit U1 drives an electric motor M1, and controls the electric motor M1 in three states, i.e., forward rotation, short break, and open, in accordance with signals on two signal lines connected to output ports P1 and P2 of the microcomputer MCU. A motor driver circuit U2 drives an electric motor M2, and controls the electric motor M2 in four states, i.e, forward rotation, backward rotation, short break, and open, in accordance with signals on two signal lines connected to output ports P3 and P4 of the microcomputer MCU.

A driver circuit U4 drives a coil H1 of the magnetic head 22 as the magnetic recording device. The driver circuit U4 supplies currents to the magnetic head 22 upon reception of the output from a magnetic recording output port PMAG of the microcomputer MCU, thus performing magnetic recording on each magnetic recording region 12 (12a, 12b, . . . ) of the film 10.

A display device DSP (e.g., a liquid crystal display element) displays an alarm display and a film counter, and changes its display contents in accordance with the output from a display drive port PDSP of the microcomputer MCU.

A nonvolatile memory EEPROM serves as a storage device. The nonvolatile memory EEPROM performs two-way communications with a port PBUS of the microcomputer MCU, and stores data necessary for the microcomputer MCU.

Note that the electric motor M1 corresponds to the motor 26 for driving the spool 25 in FIG. 2, and the electric motor M2 corresponds to the motor 28 for driving the cartridge shaft 15a in FIG. 2. The photoreflector PR1 corresponds to the photoreflector 21 in FIG. 2, and the photoreflector PR2 corresponds to the photoreflector 29 in FIG. 2. Also, the coil H1 is built in the magnetic head 22 in FIG. 2.

Figure 4:
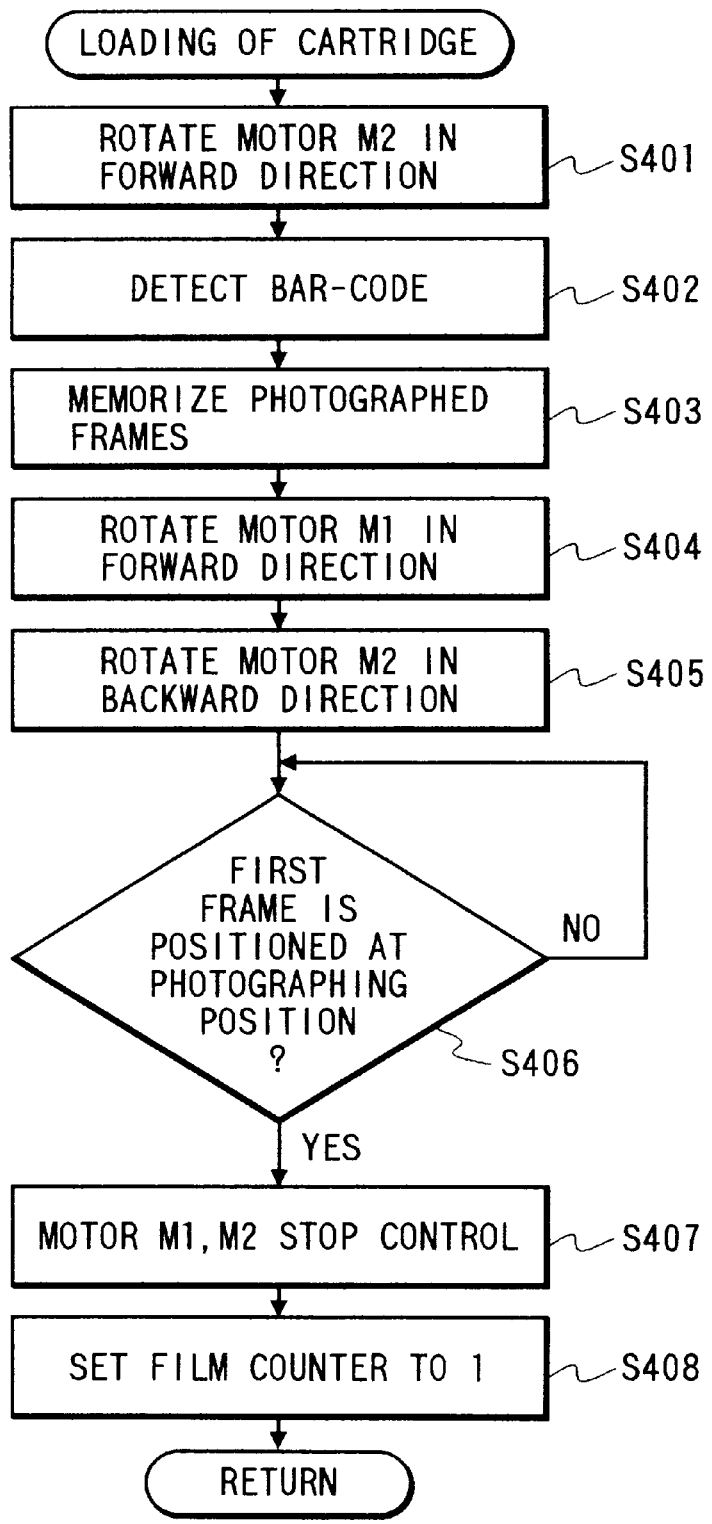
FIG. 4 is a flow chart for explaining the operation executed when the cartridge is loaded into the camera according to the present invention.
Figure 5:
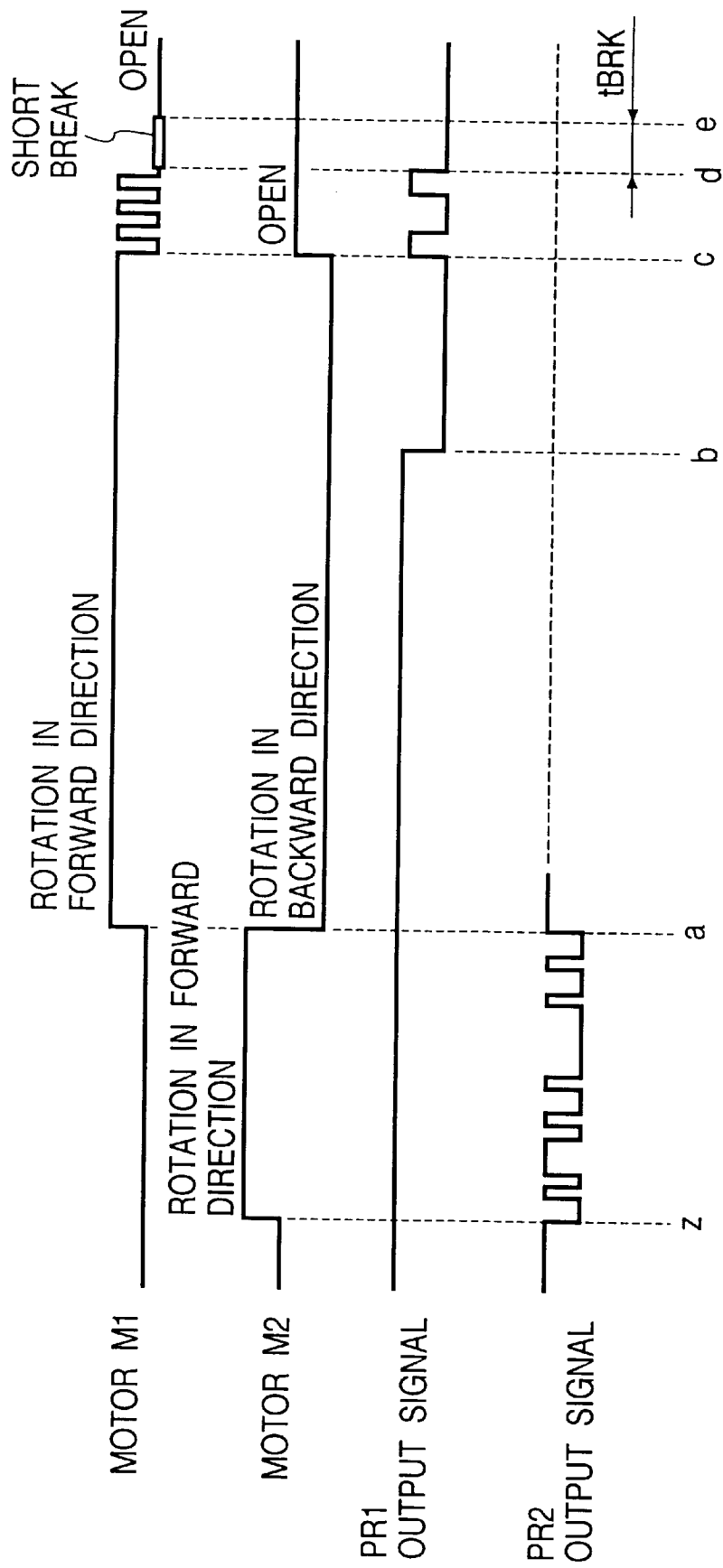
FIG. 5 is a timing chart for explaining the operation executed when the cartridge is loaded into the camera according to the present invention.

FIGS. 4 and 5 are respectively a flow chart and a timing chart showing the operation executed when the film cartridge 15 is loaded into the camera main body in this embodiment.

In these figures, when the film cartridge 15 is loaded into the camera main body, the microcomputer MCU starts its processing from step S401 in FIG. 4, and rotates the electric motor M2 (28) in the forward direction in step S401. This timing corresponds to a point Z in FIG. 5. When the electric motor M2 rotates in the forward direction, the fork 27 in FIG. 2 is rotated in the direction of an arrow in FIG. 2.

Also, the shaft 15a meshing with the fork 27, and the bar-code disc 15b of the cartridge, are also rotated in the same direction. At this time, the photoreflector 29 (PR2) detects the bar-code pattern (S402). Upon completion of detection of the bar-code pattern, the total number of frames (data of the number of photographable frames of the film) obtained by this detection, e.g., data indicating that the film allows 40 photographing operations, is stored in the EEPROM in step S403.

Subsequently, in steps S404 and S405, the electric motor M1 is rotated in the forward direction, and the electric motor M2 is rotated in the backward direction. This timing corresponds to a point a in FIG. 5.

Since the electric motor M2 rotates in the backward direction, the fork 27 is rotated in a direction opposite to the arrow in FIG. 2, and the film 10 is drawn out from the cartridge 15 and travels in the direction of the spool 25.

When the leading end of the film 10 has passed the photoreflector 21 (PR1), the output from the photoreflector PR1 goes "L" (point b in FIG. 5). When the motor is further driven, the leading end of the film 10 reaches the spool 25, and thereafter, the film is forwarded by the rotation force of the electric motor M1 via the spool 25. At this time, the spool 25 is rotated in the direction of the arrow in FIG. 2 by the forward rotation of the electric motor M1.

When the film is forwarded in this manner, the first frame of the film 10 reaches the photographing position soon. This state is identified when the photoreflector 21 (PR1) detects the first perforations 13a2 and 13b1 of the film 10.

If the photographing position of the first frame is detected in step S406, the stop control of the electric motors M1 and M2 is performed in step S407. This state corresponds to a portion from a point c to a point e in FIG. 5. More specifically, when the leading edge of the perforation 13a2 is detected at the point c, the electric motor M1 performs predetermined PWM driving, i.e., driving that alternately repeats forward rotation and short break, so as to start deceleration. At this time, the electric motor M2 is opened. When the trailing edge of the perforation 13b1 is detected at the point d, the electric motor M1 applies short-break brake for only a predetermined time period tBRK, and thereafter, is opened.

With the above-mentioned processing, the first frame of the film 10 stops at the photographing position, thus completing photographing preparation. Finally, "1" is set in the film counter in step S408, thus ending the processing. Note that the number of the film counter is stored in the EEPROM, and is also displayed on the display device DSP.

The processing after the release operation in the first embodiment will be described below with reference to FIGS. 6A, 6B, 7, and 8.

When a release button (not shown) is pressed, and photographing of the camera is started, the microcomputer MCU executes the processing in step S701 and the subsequent steps in FIG. 7.

In step S701, the photographing data at that time, e.g., the shutter speed, aperture value, the title of a picture set by the photographer, the number of prints upon printing, and the like, are stored in the EEPROM. Note that the EEPROM stores such photographing data corresponding to the film counter number at that time.

In step S702, a known photographing operation is performed, i.e., the shutter is released and the image recording region of the photographing frame is exposed. Upon completion of photographing, the electric motor M1 is rotated in the forward direction in step S703 to start film forwarding. The following explanation will be given for both a case wherein the film 10 does not reach the film end upon film forwarding, and a case wherein the film 10 reaches the film end.

[When film does not reach film end]

Upon photographing before the final frame, the next photographing frame is located at the photographing position by film forwarding. The processing in this case will be described also using the timing chart in FIG. 6A.

Figure 6A:
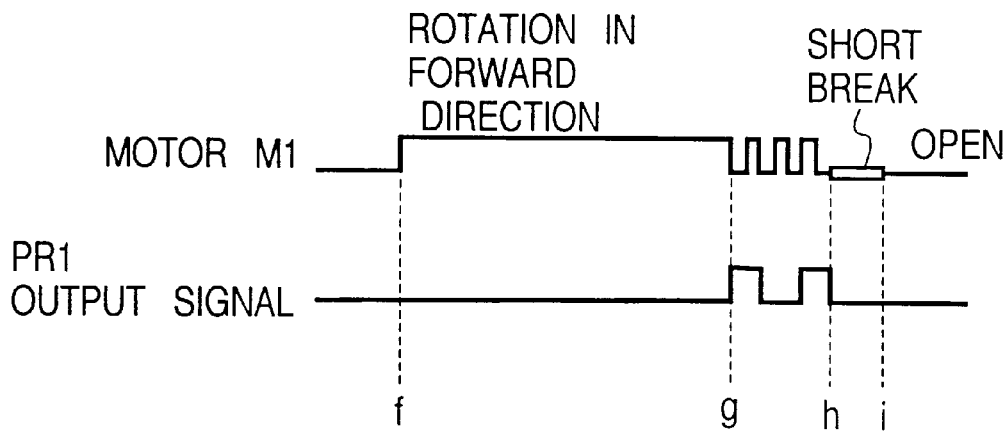
FIG. 6A is a timing chart for explaining the operation executed upon film forwarding in photographing before the final frame.

The timing at which the electric motor M1 is rotated in the forward direction in step S703 corresponds to a point f in FIG. 6A. Thereafter, it is checked in step S704 if film forwarding is completed. If NO in step S704, the flow advances to step S707 to check if the film end is detected. In this case, since the film end is not detected, the flow returns to step S704 to continue film forwarding. When film forwarding continues, the perforations of the next photographing frame are detected by the photoreflector 21 (PR1) soon.

Upon detection of the perforations, it is determined that film forwarding has been completed, and the flow advances from step S704 to step S705. In step S705, the stop control of the electric motor M1 is performed. This state corresponds to a portion from a point g to a point i in FIG. 6A. Note that this processing is the same as that from the point c to the point e in FIG. 5.

In this manner, the next photographing frame stops at the photographing position, and photographing preparation is completed. Finally, the film counter is incremented by "1" in step S706, thus ending the processing. Note that the number of the film counter is stored in the EEPROM, and is also displayed on the display device DSP.

[When film reaches film end]

Upon photographing the final frame, the film end is detected by film forwarding since no next photographing frame is present. The processing in this case will be described below also using the timing charts in FIGS. 6B and 8.

Figure 6B:
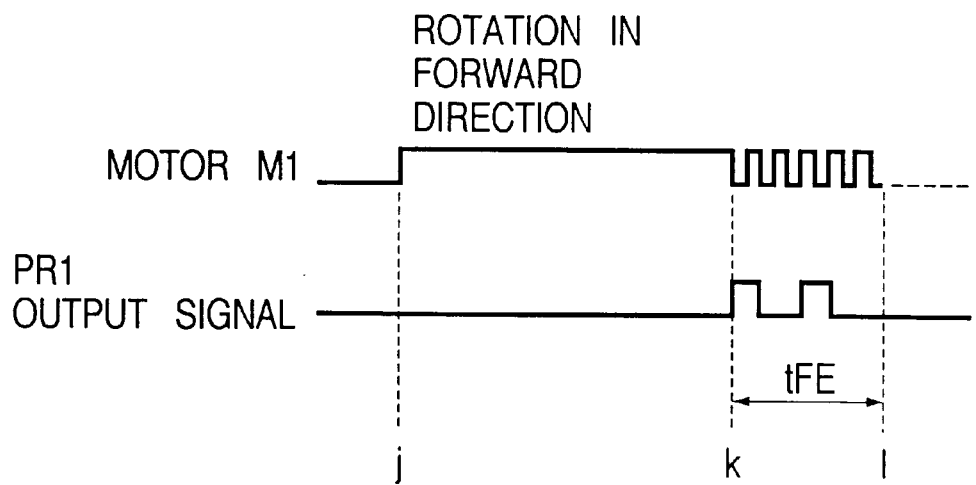
FIG. 6B is a timing chart for explaining the operation executed upon film forwarding after the final frame is photographed.

The timing at which the electric motor M1 is rotated in the forward direction in step S703 in FIG. 7 corresponds to a point j in FIG. 6B. Thereafter, it is checked in step S704 if film forwarding is completed. If NO in step S704, the flow advances to step S707 to check if the film end is detected.

In film forwarding after the final frame, since there is no next photographing frame, only one perforation is detected by the photoreflector 21 (PR1), although two perforations are normally detected as shown in FIG. 6A. Therefore, when the second perforation is not detected after an elapse of a predetermined time period tFE from the detection timing of the first perforation, i.e., a point k in FIG. 6B, it is determined that the film has reached the film end (a point l in FIG. 6B).

At this time, the flow advances from step S707 to step S708, and the count number of the film counter at that time is compared with the total number of frames which is detected from the bar-code pattern on the bar-code disc 15b upon loading the cartridge 15, and is stored in the EEPROM, in step S708. Normally, since all the photographing frames of the film 10 have been photographed, these two values should coincide with each other.

If the two values coincide with each other, it is determined that the film counter is normal, and the flow advances to the processing in step S709 and the subsequent steps. In this processing, magnetic recording is performed while rewinding the film 10 into the cartridge 15.

First, the forward rotation of the electric motor M2 is started in step S709. This timing corresponds to a point m in FIG. 8. Upon forward rotation of the electric motor M2, the fork 27 is rotated in the direction of the arrow in FIG. 2, and the film 10 begins to be rewound. When the film 10 begins to travel, the perforations of the individual photographing frames are detected by the photoreflector 21 (PR1). Using this detection result, the photographing data stored corresponding to the film counter number of each frame during film forwarding are read out from the EEPROM, and are magnetically recorded on the magnetic recording region 12 on the film 10 in step S711.

This processing will be described below with reference to FIG. 8. Since the final frame has only one perforation, magnetic recording of the photographing data corresponding to the film counter number of the final frame is started from a point n corresponding to the trailing edge of the first perforation. The photographing data to be magnetically recorded are output from the port PMAG of the microcomputer MCU to the coil H1 of the magnetic head 22 via the driver circuit U4, and are recorded on the film 10.

Since a frame other than the final frame has two perforations, magnetic recording of the photographing data corresponding to the film counter number of that frame is started from a point o corresponding to the trailing edge of the second perforation. Film rewinding is performed while executing magnetic recording in this manner, and it is then checked in step S712 if film rewinding is completed. If NO in step S712, the flow returns to step S710 to continue film rewinding while executing magnetic recording.

When film rewinding continues, the leading end of the film 10 passes the photoreflector 21 (PR1) soon. This timing corresponds to a point p in FIG. 8.

Thereafter, since the output from the photoreflector 21 (PR1) remains "H", if the output from the photoreflector 21 (PR1) stays "H" over a predetermined time period tFREND, it is determined in step S712 that film rewinding has been completed, and the bar-code disc 15b is stopped at the "fully exposed" position in step S716. This processing corresponds to points r and s in FIG. 8.

The stop control of the bar-code disc 15b is attained in such a manner that the electric motor 28 (M2) is braked by setting it in the short-break state upon detecting a bar-code signal from the photoreflector 29 (PR2) to detect a predetermined pattern, and thereafter, the electric motor M2 is opened.

With the above-mentioned processing, the corresponding photographing data upon photographing are respectively magnetically recorded on the individual photographing frames of the film 10, the film 10 is completely rewound into the cartridge 15, and the bar-code disc 15b of the cartridge 15 is stopped at the "fully exposed" position, thus ending the processing.

On the other hand, in step S708 above, if the count number of the film counter does not coincide with the total number of frames of the film 10, which is detected based on the bar-code pattern on the bar-code disc 15b upon loading the cartridge 15, and is stored in the EEPROM, since the film counter number is wrong, the flow advances to step S713 to perform an alarm display on the display device DSP.

Subsequently, the forward rotation of the electric motor M2 is started in step S714 to rewind the film 10. In this case, magnetic recording is not performed. The stop control waits in step S715 until rewinding is completed, and the bar-code disc 15b is stopped at the "fully exposed" position in step S716, thus ending the processing.

Figure 9:
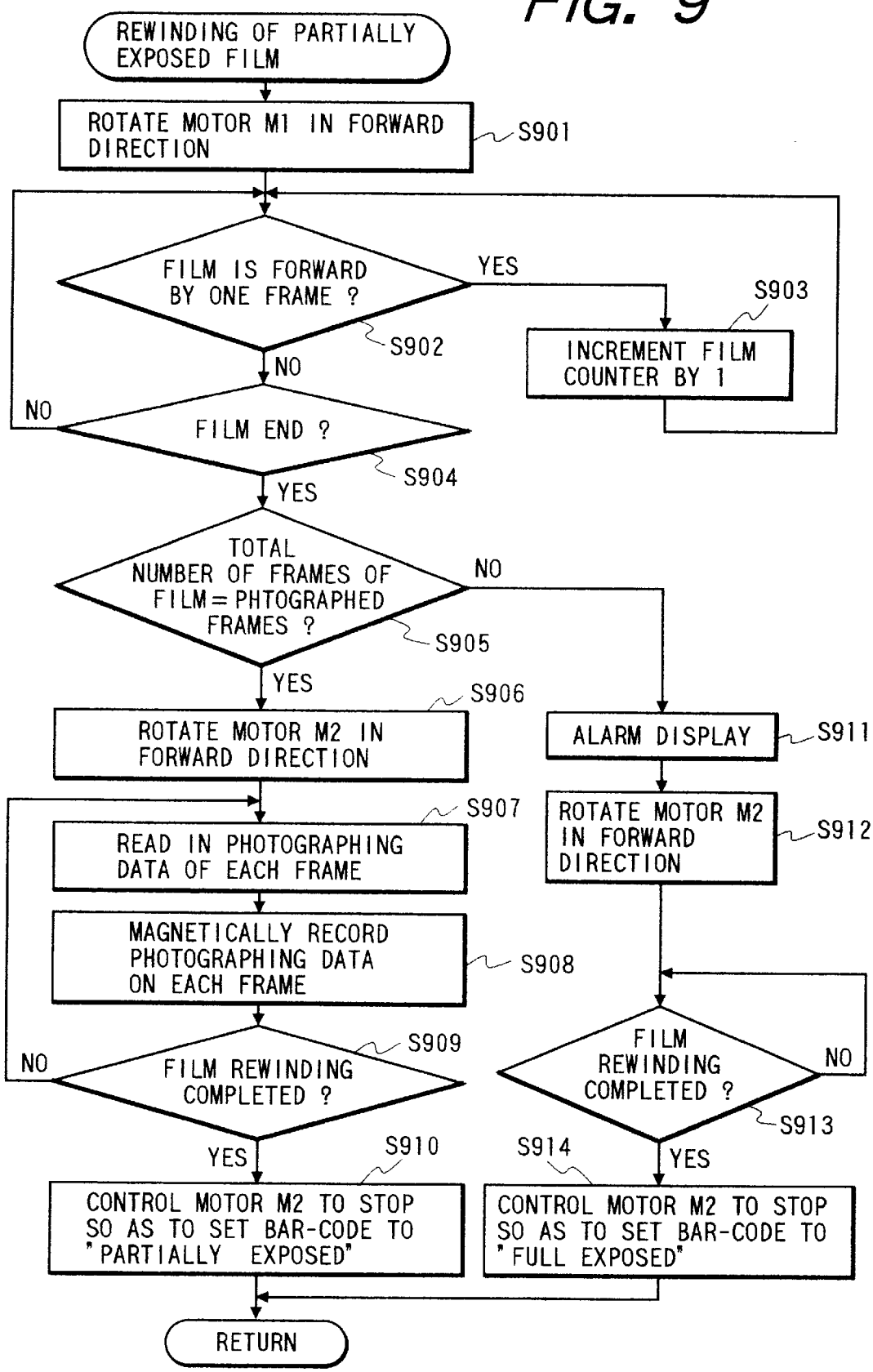
FIG. 9 is a flow chart for explaining rewinding of a partially exposed film according to the second embodiment of the present invention.

FIG. 9 is a flow chart showing another embodiment of the camera according to the first aspect of the present invention. In this embodiment, even when the partially exposed film 10 is rewound, the film counter errors can be detected.

More specifically, when the photographer instructs to rewind a partially exposed film 10 by operating a partially exposed film rewind button (not shown), the microcomputer MCU executes processing in step S901 and the subsequent steps.

In step S901, the electric motor M1 is rotated in the forward direction to forward the film 10. Forwarding of the film 10 continues until the film end is detected in step S904. During forwarding, every time it is detected in step S902 that the film is forwarded by one frame, the count number of the film counter is incremented by "1" in step S903.

The film end and whether or not the film is forwarded by one frame are detected in the same manner as in the above-mentioned embodiment.

In this manner, when rewinding of the partially exposed film is instructed, the film is continuously forwarded up to the film end while incrementing the film counter. Thereafter, in step S905, the count number of the film counter is compared with the total number of frames of the film. If these two values coincide with each other, film rewinding is performed while performing magnetic record processing by the processing in steps S906 to S909. This processing is the same as that in steps S709 to S712 in FIG. 7. In this case, since no photographing data are stored in correspondence with the frames which have passed by the above-mentioned continuous forwarding, no magnetic recording is performed, and magnetic recording is performed on only frames which had been photographed before rewinding of the partially exposed film was instructed.

Upon completion of film rewinding, the bar-code disc 15b is stopped at the "partially exposed" position in step S910, thus ending the processing. When the bar-code disc 15b is stopped at the "partially exposed" position, and that film cartridge 15 is re-loaded into the camera main body, the exposed frames are continuously forwarded by detecting the presence/absence of magnetic recording, and photographing can be restarted from an unexposed frame.

On the other hand, in step S905 above, if the two values do not coincide with each other, an alarm display is performed in step S911, and film rewinding is performed in steps S912 and S913 without any magnetic recording in the same manner as in the above-mentioned embodiment. Thereafter, the bar-code disc 15b is stopped at the "fully exposed" position in step S914, thus ending the processing.

The reason why the bar-code disc 15b is stopped at the "fully exposed" position although the partially exposed film was rewound is as follows. That is, since film counter errors have occurred, and magnetic recording cannot be performed, if the cartridge 15 having the partially exposed film 10 is reloaded by detecting the presence/absence of magnetic recording, exposed and unexposed frames cannot be accurately discriminated, and the film may be double-exposed.

As described above, according to the first aspect of the present invention, a camera which stores photographing data in units of photographing frames upon photographing, and magnetically records the stored photographing data on magnetic recording regions of corresponding photographing frames on a film upon film rewinding, comprises a control device for magnetically recording the stored photographing data on the magnetic recording regions of the corresponding photographing frames on the film upon film rewinding, a photographable frame number detection device for detecting the number of photographable frames from an information device provided to a film cartridge, a film counter device for incrementing a count number by 1 every time one frame is photographed, a film end detection device for detecting the film end, and a comparison device for comparing the number of photographable frames detected by the photographable frame number detection device and the count number of the film counter device when the film end detection device detects the film end. For this reason, the camera of this aspect can provide the following excellent effects although it has a simple structure.

According to the present invention, since the film counter and the number of photographable frames are checked when the film has reached its film end, if errors are detected between the number of photographable frames of the film and the count number, the alarm display device for producing an alarm indicating errors in magnetic recording can make an alarm display to inform the photographer of the errors. Accordingly, when the photographer asks a processing laboratory to develop and print this film, he or she can inform the processing laboratory of the errors, thus preventing unwanted prints from being formed, and improving reliability upon executing magnetic recording during film rewinding.

Also, according to the present invention, when errors between the number of photographable frames of the film and the count number are detected, as described above, the control device for magnetically recording photographing data inhibits magnetic recording, and unwanted prints based on wrong magnetic recording data can be prevented from being formed.

Furthermore, according to the present invention, the camera comprises the set device for setting the film cartridge in different states corresponding to the exposed state after completion of film rewinding, and when the comparison device for comparing the number of photographable frames obtained by the photographable frame number detection device and the count number of the film counter device detects a non-coincidence between the two values, the set device sets the film cartridge in the "fully exposed" state irrespective of the actual exposed state of that film, thereby preventing double-exposure of the film by reloading it.

According to the present invention, the camera comprises the partially exposed film rewinding start device for rewinding the film from an arbitrary number of frames, a continuous forwarding control device for continuously forwarding the film until the film end is detected by the film end detection device, and a set device for setting the film cartridge in different states corresponding to the exposed state after completion of film rewinding, and when the comparison device for comparing the number of photographable frames obtained by the photographable frame number detection device and the count number of the film counter device detects a non-coincidence between the two values, the set device sets the film cartridge in the "fully exposed" state irrespective of the actual exposed state of that film, thus obtaining the above-mentioned effect in either film rewinding from the film end or rewinding of the partially exposed film, and improving reliability upon executing magnetic recording during film rewinding.

An embodiment of the processing after the release operation of a camera according to the second aspect of the present invention will be described below with reference to FIGS. 10 and 6A.

Figure 10:
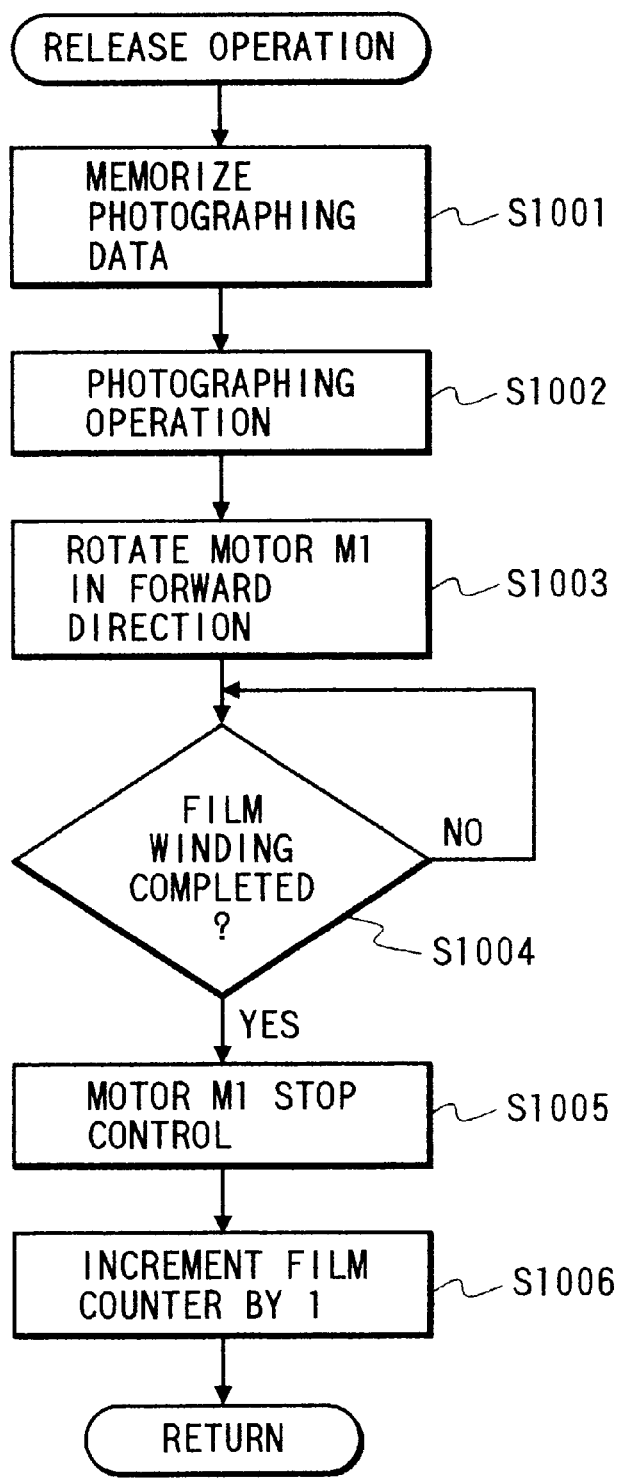
FIG. 10 is a flow chart for explaining photographing upon a release operation of the camera according to the third embodiment of the present invention.

When a release button (not shown) is pressed and photographing of the camera is started, the microcomputer MCU executes processing in step S1001 and the subsequent steps in FIG. 10.

In step S1001, the photographing data at that time, e.g., the shutter speed, aperture value, the title of a picture set by the photographer, the number of prints upon printing, and the like, are stored in the EEPROM. Note that the EEPROM stores such photographing data corresponding to the film counter number at that time.

In step S1002, a known photographing operation is performed, i.e., the shutter is released and the image recording region of the photographing frame is exposed. Upon completion of photographing, the electric motor M1 is rotated in the forward direction in step S1003 to start film forwarding.

The processing in this case will be explained below also using the timing chart in FIG. 6A. More specifically, the timing at which the electric motor M1 is rotated in the forward direction in step S1003 corresponds to a point f in FIG. 6A. Thereafter, it is checked in step S1004 if film forwarding is completed. If NO in step S1004, the flow returns to step S1004 to continue film forwarding. When film forwarding continues, the perforations of the next photographing frame are detected by the photoreflector 21 (PR1) soon.

Upon detection of the perforations, it is determined that film forwarding has been completed, and the flow advances from step S1004 to step S1005. In step S1005, the stop control of the electric motor M1 is performed. This state corresponds to a portion from a point g to a point i in FIG. 6A. Note that this processing is the same as that from the point c to the point e in FIG. 5.

In this manner, the next photographing frame stops at the photographing position, and photographing preparation is completed. Finally, the film counter is incremented by "1" in step S1006, thus ending the processing. Note that the number of the film counter is stored in the EEPROM, and is also displayed on the display device DSP.

The operation upon rewinding the film 10 will be described below with reference to the flow chart in FIG. 11 and the timing chart in FIG. 8.

Figure 11:
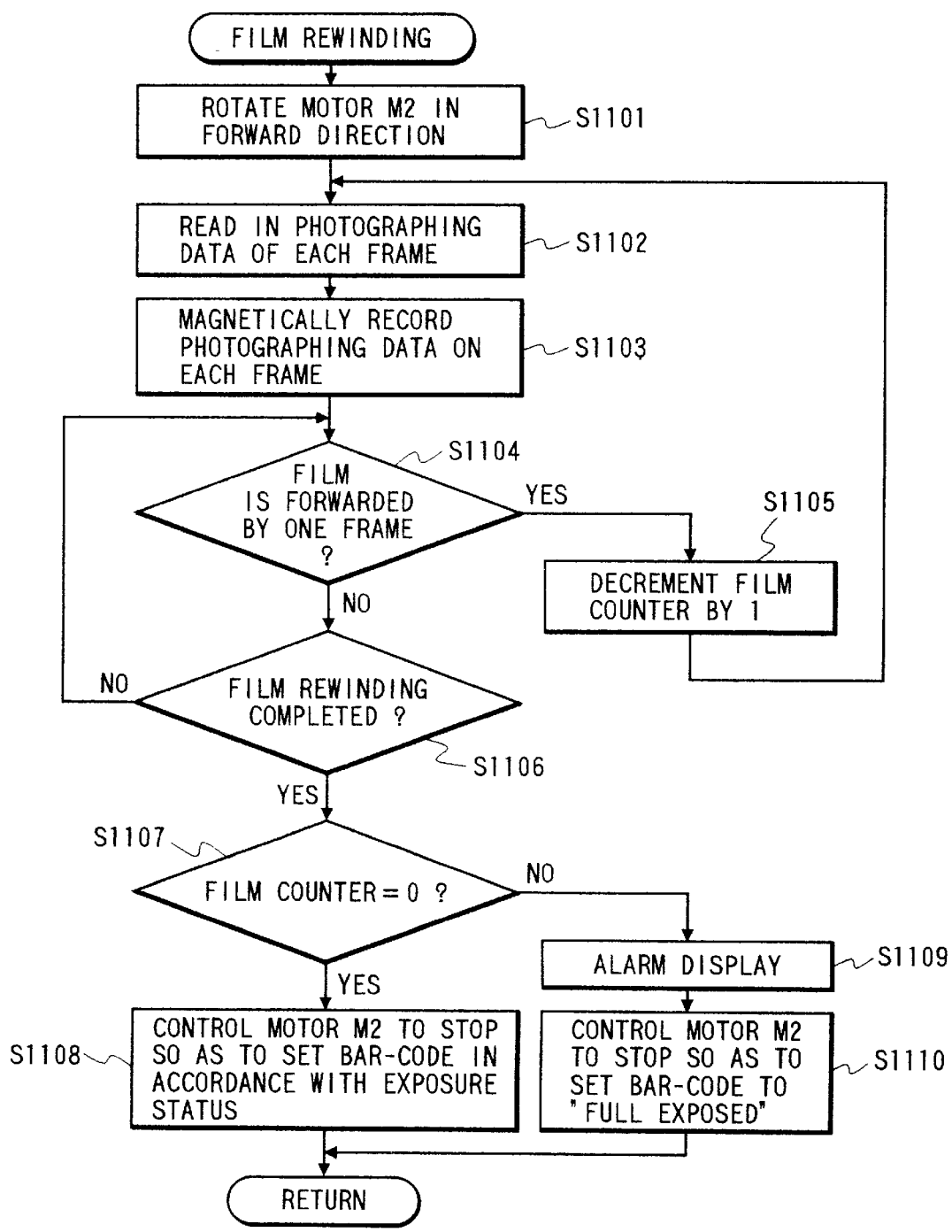
FIG. 11 is a flow chart for explaining the operation upon film rewinding after photographing according to the third embodiment of the present invention.

More specifically, when the film end has been reached, or when the photographer presses a partially exposed film rewinding button (not shown) to instruct rewinding of a partially exposed film 10, the microcomputer MCU executes processing in step S1101 and the subsequent steps in FIG. 11.

In this embodiment, magnetic recording is performed while rewinding the film 10. In step S1101, the forward rotation of the electric motor M2 is started. This timing corresponds to a point m in FIG. 8. Upon forward rotation of the electric motor M2, the fork 27 is rotated in the direction of the arrow in FIG. 2, and the film 10 begins to be rewound. When the film 10 begins to travel, the perforations of the individual photographing frames are detected by the photoreflector 21 (PR1). Using this detection result, the photographing data stored corresponding to the film counter number of each frame during film forwarding are read out from the EEPROM in step S1102, and are magnetically recorded on the magnetic recording region 12 on the film 10 in step S1103.

This processing will be described below with reference to FIG. 8. Since the final frame has only one perforation, magnetic recording of the photographing data corresponding to the film counter number of the final frame is started from a point n corresponding to the trailing edge of the first perforation. The photographing data to be magnetically recorded are output from the port PMAG of the microcomputer MCU to the coil H1 of the magnetic head 22 via the driver circuit U4, and are recorded on the film 10.

Since a frame other than the final frame has two perforations, magnetic recording of the photographing data corresponding to the film counter number of that frame is started from a point o corresponding to the trailing edge of the second perforation.

After film rewinding is performed while executing magnetic recording in this manner, it is then checked in step S1104 if film rewinding for one frame is completed. This checking is attained since the perforations of the next photographing frame are detected by the photoreflector 21 (PR1) upon completion of film rewinding for one frame, as shown in FIG. 8.

If film rewinding for one frame has been completed, the film counter is decremented by "1" in step S1105, and the flow returns to step S1102 to perform magnetic recording of the next photographing frame. On the other hand, if film rewinding for one frame has not been completed yet in step S1104, the flow advances to step S1106 to check if film rewinding is completed. If NO in step S1106, the flow returns to step S1104 to continue film rewinding.

When film rewinding continues, the leading end of the film 10 passes the photoreflector 21 (PR1) soon. This timing corresponds to a point p in FIG. 8. Thereafter, since the output from the photoreflector 21 (PR1) remains "H", if the output from the photoreflector 21 (PR1) stays "H" over a predetermined time period tFREND, it is determined in step S1106 that film rewinding has been completed. Upon completion of film rewinding, the flow advances to step S1107 to check if the film counter number at that time is "0". If the film counter number is normal, the film counter should indicate "0" at the time of completion of film rewinding, i.e., when the film 10 is further rewound from the first frame.

Therefore, if it is determined in step S1107 that the film counter number is "0", it is determined that magnetic recording is normally done, and the flow advances to step S1108. In step S1108, the stop control of the motor M2 is made so that the bar-code disc 15b shows a proper exposed state of that film. This processing corresponds to points r and s in FIG. 8.

The stop control of the bar-code disc 15b is attained in such a manner that the electric motor M2 is braked by setting it in the short-break state upon detecting a bar-code signal from the photoreflector 29 (PR2) to detect a predetermined pattern, and thereafter, the electric motor M2 is opened.

For example, when photographing is made up to the film end and the film is rewound, the bar-code disc 15b is stopped at the "fully exposed" position. On the other hand, when a partially exposed film 10 is rewound, the bar-code disc 15b is stopped at the "partially exposed" position. When this bar-code disc 15b is stopped at the "partially exposed"

position, and when that film 10 is reloaded, photographing can be restarted from an unexposed frame by detecting the presence/absence of magnetic recording.

With the above-mentioned processing, the corresponding photographing data upon photographing are respectively magnetically recorded on the individual photographing frames of the film 10, the film 10 is completely rewound into the cartridge 15, and the bar-code disc 15b of the cartridge 15 is stopped at the position corresponding to the exposed state of that film 10, thus ending the processing.

On the other hand, if it is determined in step S1107 that the film counter number is other than "0", e.g., "1" or "−1", it is determined that errors have occurred during film forwarding or rewinding, and the film counter indicates a wrong number. When magnetic recording is performed during film rewinding like in this embodiment, since the magnetic recording contents use the photographing data stored corresponding to the film counter number, if the film counter indicates a wrong number, it means that magnetic recording has failed.

Accordingly, in such case, the flow advances to step S1109 to perform an alarm display on the display device DSP.

Subsequently, in step S1110, the bar-code disc 15b is forcibly stopped at the "fully exposed" position irrespective of the actual exposed state of the film 10, thus ending the processing. The reason why the bar-code disc 15b is forcibly stopped at the "fully exposed" position irrespective of the actual exposed state of the film 10 is as follows. That is, when the film counter number is wrong and magnetic recording has failed, if the bar-code disc 15b is set at the "partially exposed" position, exposed frames may be double-exposed when the partially exposed film 10 is reloaded by detecting the presence/absence of magnetic recording.

Figure 12:
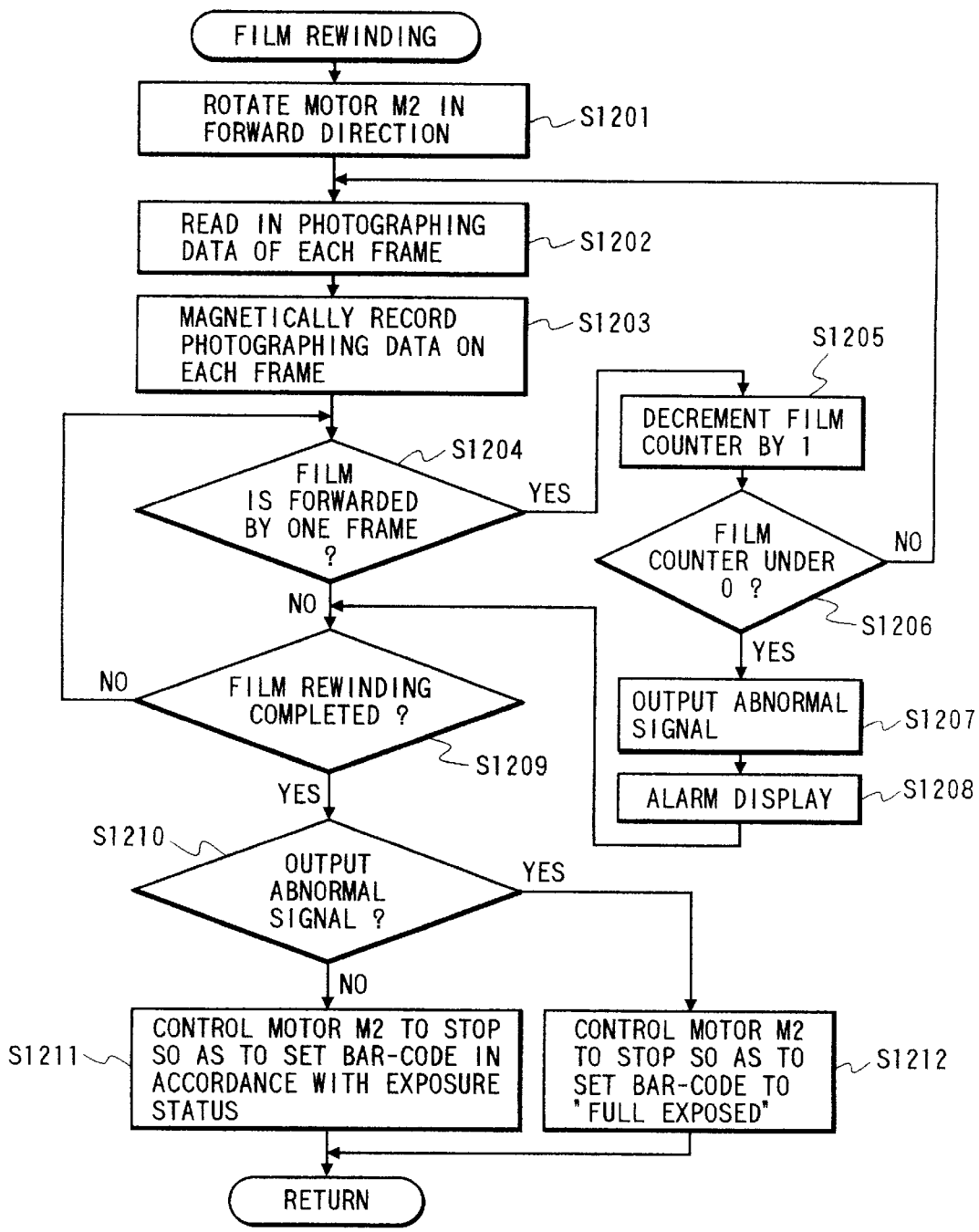
FIG. 12 is a flow chart for explaining the operation upon making an alarm display during film rewinding according to the fourth embodiment of the present invention.

FIG. 12 is a flow chart showing another embodiment of the camera according to the second aspect of the present invention.

In this embodiment, the film counter is not checked upon completion of film rewinding, but when the film counter indicates a negative number during film rewinding, an alarm display is made at that time, and if the alarm state continues after completion of film rewinding, the bar-code disc 15b is forcibly stopped at the "fully exposed" position.

In FIG. 12, the processing in steps S1201 to S1204 is the same as that in steps S1101 to S1104 in FIG. 11. Upon completion of film rewinding for one frame in step S1204, the film counter number is decremented by "1" in step S1205.

Subsequently, in this embodiment, it is checked in step S1206 if the film counter number is negative. If the film counter number is negative, e.g., "−1", since it can be confirmed at that time that the film counter number is wrong as in the above-mentioned embodiment, the microcomputer MCU outputs an abnormal signal in step S1207 to start an alarm display in step S1208.

Thereafter, the flow advances to step S1209 to continue the processing until film rewinding is completed. If it is determined in step S1206 that the film counter number is "positive" or "0", the flow returns to step S1202 to continue magnetic recording of the next photographing frame.

When film rewinding continues in this manner, and completion of film rewinding is detected in step S1209 as in the above-mentioned embodiment, the flow advances to step S1210 to check if the microcomputer MCU outputs an abnormal signal.

If a negative film counter number is detected in step S1206 and the microcomputer MCU outputs an abnormal signal in step S1207, the flow advances to step S1212 to forcibly stop the bar-code disc 15b at the "fully exposed" position irrespective of the actual exposed state of that film 10, thus ending the processing.

On the other hand, if it is determined in step S1210 that the microcomputer MCU does not output any abnormal signal, the flow advances to step S1211 to perform the stop control of the electric motor M2 so that the bar-code disc 15b indicates the actual exposed state of that film 10.

As described above, according to the second aspect of the present invention, a camera which stores photographing data in units of photographing frames upon photographing, and magnetically records the stored photographing data on magnetic recording regions of corresponding photographing frames on a film upon film rewinding, comprises a film counter device for incrementing the count number upon film forwarding every time one frame is photographed, and decrementing the count number upon film rewinding every time the film is rewound by one frame, a rewinding completion detection device for detecting completion of film rewinding, and a detection device for detecting if the count number of the film counter device is a predetermined number when the rewinding completion detection device detects completion of film rewinding. By also arranging an alarm display device for generating an alarm as for errors in magnetic recording based on the detection result of the detection device, the camera of the second aspect can provide the following excellent effects although it has a simple arrangement.

According to the present invention, since the film counter device is checked upon completion of film rewinding, if errors are detected, the alarm display device or the like can perform an alarm display to inform the photographer of the errors. Accordingly, when the photographer asks a processing laboratory to develop and print this film, he or she can inform the processing laboratory of the errors, thus preventing unwanted prints from being formed, and improving reliability upon executing magnetic recording during film rewinding.

Also, according to the present invention, the camera comprises a set device for setting the film cartridge in different states corresponding to the exposed state after completion of film rewinding, and when the detection device for detecting if the count number is the predetermined number upon completion of film rewinding detects that the count number of the film counter device is not the predetermined number, the set device sets the film cartridge in the "fully exposed" state upon completion of film rewinding irrespective of the actual exposed state of that film, thereby preventing double-exposure of the film upon reloading it into the camera.

Furthermore, according to the present invention, since a camera which stores photographing data in units of photographing frames upon photographing, and magnetically records the stored photographing data on magnetic recording regions of corresponding photographing frames on a film upon film rewinding, comprises a film counter device for incrementing the count number upon film forwarding every time one frame is photographed, and decrementing the count number upon film rewinding every time the film is rewound by one frame, and an abnormal signal output device for outputting an abnormal signal when the count number of the film counter device becomes lower than the predetermined number, if film counter errors are detected based on the abnormal signal, the alarm display device can perform an alarm display to inform the photographer of the errors. Accordingly, when the photographer asks a processing laboratory to develop and print this film, he or she can inform the processing laboratory of the errors, thus preventing unwanted prints from being formed.

Also, according to the present invention, the camera comprises a set device for setting the film cartridge in different states corresponding to the exposed state after completion of film rewinding, and when the abnormal signal output from the abnormal signal output device is detected during film rewinding, as described above, the set device sets the film cartridge in the "fully exposed" state upon completion of film rewinding irrespective of the actual exposed state of that film, thereby preventing double-exposure of the film upon reloading it into the camera, and improving reliability upon executing magnetic recording during film rewinding.

Note that the present invention is not limited to the specific structure described in each of the above embodiments, and the shapes, structures, and the like of the individual portions can be appropriately modified or changed, needless to say. For example, each of the above embodiments uses, as the film 10 stored in the cartridge 15 to be loaded into the camera main body, an IX240 type photographic film based on new standards called Advanced Photo System, which film has, on its 24-mm wide silver halide film surface, the image recording regions 11 (11*a*, 11*b*, . . . ), and the magnetic recording regions 12 (12*a*, 12*b*, . . . ) for storing various kinds of photographing information. However, the present invention is not limited to such specific film. Any other film cartridges or patrones that store roll films having magnetic recording regions may be used.

Also, as the camera, for example, an IX240 type camera which can load the above-mentioned film with the magnetic recording regions and has a magnetic recording device has been exemplified. However, the present invention is not limited to such specific camera.

What is claimed is:

1. A camera which stores photographing data in units of photographing frames upon photographing, and magnetically records the stored photographing data in magnetic recording regions of the corresponding photographing frames on a film during film rewinding, comprising:

a control device for magnetically recording the stored photographing data on the magnetic recording regions of the corresponding photographing frames on the film during film rewinding;

a photographable frame number detection device for detecting the number of photographable frames of the film from an information device provided to a film cartridge;

a film counter device for incrementing a count number every time one frame is photographed;

a film end detection device for detecting a film end;

a comparison device for comparing the number of photographable frames detected by said photographable frame number detection device and the count number of said film counter device when said film end detection device detects the film end; and an alarm display device for producing an alarm indicating errors in magnetic recording, and wherein when said comparison device for comparing the number of photographable frames detected by said photographable frame number detection device with the count number of said film counter device detects that the number of photographable frames and the count number are not the same, said alarm display device performs an alarm display.

2. A camera which stores photographing data in units of photographing frames upon photographing, and magnetically records the stored photographing data in magnetic recording regions of the corresponding photographing frames on a film during film rewinding, comprising:

a control device for magnetically recording the stored photographing data on the magnetic recording regions of the corresponding photographing frames on the film during film rewinding;

a photographable frame number detection device for detecting the number of photographable frames of the film from an information device provided to a film cartridge;

a film end detection device for detecting a film end;

a partially exposed film rewinding start device for rewinding the film from an arbitrary frame number;

a continuous forwarding control device for continuously forwarding the film until said film end detection device detects the film end when said partially exposed film rewinding start device is started;

a film counter device for incrementing a count number every time one frame is photographed and every time the film is forwarded by one frame by said continuous forwarding control device upon starting said partially exposed film rewinding start device;

a comparison device for comparing the number of photographable frames detected by said photographable frame number detection device with the count number of said film counter device when said film end detection device detects the film end;

an alarm display device for producing an alarm indicating errors in magnetic recording, and wherein when said comparison device for comparing the number of photographable frames detected by said photographable frame number detection device with the count number of said film counter device detects that the number of photographable frames and the count number are not the same, said alarm display device performs an alarm display.

3. A camera which stores photographing data in units of photographing frames upon photographing, and magnetically records the stored photographing data in magnetic recording regions of the corresponding photographing frames on a film during film rewinding, comprising:

a film counter device for incrementing a count number every time one frame is photographed during film forwarding, and decrementing the count number during film rewinding every time the film is rewound by one frame;

a rewinding completion detection device for detecting completion of film rewinding;

a detection device for detecting if the count number of said film counter device is a predetermined number when said rewinding completion detection device detects completion of film rewinding; and an alarm display device for producing an alarm indicating errors in magnetic recording, and wherein when said detection device for detecting if the count number of said film counter device is the predetermined number detects that the count number of said film counter device is not the predetermined number, said alarm display device performs an alarm display.

4. A camera which stores photographing data in units of photographing frames upon photographing, and magnetically records the stored photographing data in magnetic recording regions of the corresponding photographing frames on a film during film rewinding, comprising:

a film counter device for incrementing the count number every time one frame is photographed during film forwarding, and decrementing the count number during film rewinding every time the film is rewound by one frame; and an abnormal signal output device for outputting an abnormal signal when the count number of said film counter device becomes lower than the predetermined number during film rewinding.

5. A camera according to claim 4, further comprising:

an alarm display device for producing an alarm indicating errors in magnetic recording, and wherein when the abnormal signal output from said abnormal signal output device is detected since the count number of said film counter device becomes lower than the predetermined number during film rewinding, said alarm display device performs an alarm display.

6. A camera according to claim 4, further comprising:

a set device for setting the film cartridge in different states corresponding to an exposed state after completion of film rewinding, and wherein when the abnormal signal output from said abnormal signal output device is detected since the count number of said film counter device becomes lower than the predetermined number during film rewinding, said set device sets the film cartridge in a fully exposed state irrespective of an actual exposed state of the film.

7. A camera which stores photographing data in units of photographing frames upon photographing, and magnetically records the stored photographing data in magnetic recording regions of the corresponding photographing frames on a film during film rewinding, comprising:

a control device for magnetically recording the stored photographing data on the magnetic recording regions of the corresponding photographing frames on the film during film rewinding;

a photographable frame number detection device for detecting the number of photographable frames of the film from an information device provided to a film cartridge;

a film counter device for incrementing a count number every time one frame is photographed;

a film end detection device for detecting a film end;

a comparison device for comparing the number of photographable frames detected by said photographable frame number detection device and the count number of said film counter device when said film end detection device detects the film end;

wherein when said comparison device for comparing the number of photographable frames detected by said photographable frame number detection device with the count number of said film counter device detects that the number of photographable frames and the count number are the same, said control device for magnetically recording the photographing data performs normal magnetic recording, and when said comparison device detects that the number of photographable frames and the count number are not the same, magnetic recording by said control device is inhibited.

8. A camera which stores photographing data in units of photographing frames upon photographing, and magnetically records the stored photographing data in magnetic recording regions of the corresponding photographing frames on a film during film rewinding, comprising:

a control device for magnetically recording the stored photographing data on the magnetic recording regions of the corresponding photographing frames on the film during film rewinding;

a photographable frame number detection device for detecting the number of photographable frames of the film from an information device provided to a film cartridge;

a film counter device for incrementing a count number every time one frame is photographed;

a film end detection device for detecting a film end;

a comparison device for comparing the number of photographable frames detected by said photographable frame number detection device and the count number of said film counter device when said film end detection device detects the film end; and a set device for setting the film cartridge in different states corresponding to an exposed state after completion of film rewinding, and wherein when said comparison device for comparing the number of photographable frames detected by said photographable frame number detection device with the count number of said film counter device detects that the number of photographable frames and the count number are not the same, said set device sets the film cartridge in a fully exposed state irrespective of an actual exposed state of the film.

9. A camera which stores photographing data in units of photographing frames upon photographing, and magnetically records the stored photographing data in magnetic recording regions of the corresponding photographing frames on a film during film rewinding, comprising:

a control device for magnetically recording the stored photographing data on the magnetic recording regions of the corresponding photographing frames on the film during film rewinding;

a photographable frame number detection device for detecting the number of photographable frames of the film from an information device provided to a film cartridge;

a film end detection device for detecting a film end;

a partially exposed film rewinding start device for rewinding the film from an arbitrary frame number;

a continuous forwarding control device for continuously forwarding the film until said film end detection device detects the film end when said partially exposed film rewinding start device is started;

a film counter device for incrementing a count number every time one frame is photographed and every time the film is forwarded by one frame by said continuous forwarding control device upon starting said partially exposed film rewinding start device;

a comparison device for comparing the number of photographable frames detected by said photographable frame number detection device with the count number of said film counter device when said film end detection device detects the film end, wherein when said comparison device for comparing the number of photographable frames detected by said photographable frame number detection device with the count number of said film counter device detects that the number of photographable frames and the count number are the same, said control device for magnetically recording the photographing data performs normal magnetic recording, and when said comparison device detects that the number of photographable frames and the count number are not the same, magnetic recording by said control device is inhibited.

10. A camera which stores photographing data in units of photographing frames upon photographing, and magnetically records the stored photographing data in magnetic recording regions of the corresponding photographing frames on a film during film rewinding, comprising:

a control device for magnetically recording the stored photographing data on the magnetic recording regions of the corresponding photographing frames on the film during film rewinding;

a photographable frame number detection device for detecting the number of photographable frames of the film from an information device provided to a film cartridge;

a film end detection device for detecting a film end;

a partially exposed film rewinding start device for rewinding the film from an arbitrary frame number;

a continuous forwarding control device for continuously forwarding the film until said film end detection device detects the film end when said partially exposed film rewinding start device is started;

a film counter device for incrementing a count number every time one frame is photographed and every time the film is forwarded by one frame by said continuous forwarding control device upon starting said partially exposed film rewinding start device;

a comparison device for comparing the number of photographable frames detected by said photographable frame number detection device with the count number of said film counter device when said film end detection device detects the film end; and a set device for setting the film cartridge in a different state corresponding to an exposed state after completion of film rewinding, and wherein when said comparison device for comparing the number of photographable frames detected by said photographable frame number detection device with the count number of said film counter device detects that the number of photographable frames and the count number are not the same, said set device sets the film cartridge in a fully exposed state irrespective of an actual exposed state of the film.

11. A camera which stores photographing data in units of photographing frames upon photographing, and magnetically records the stored photographing data in magnetic recording regions of the corresponding photographing frames on a film during film rewinding, comprising:

a film counter device for incrementing a count number every time one frame is photographed during film forwarding, and decrementing the count number during film rewinding every time the film is rewound by one frame;

a rewinding completion detection device for detecting completion of film rewinding; and a detection device for detecting if the count number of said film counter device is a predetermined number when said rewinding completion detection device detects completion of film rewinding; and a set device for setting the film cartridge in different states corresponding to an exposed state after completion of film rewinding, and wherein when said detection device for detecting if the count number of said film counter device is the predetermined number detects that the count number of said film counter device is not the predetermined number, said set device sets the film cartridge in a fully exposed state irrespective of an actual exposed state of the film.

* * * * *